$P^{31}$ MR Spectra at Different Stages of Neutralization of Butane-1,2,3,4-Tetraphosphonic Acid

OCTAMETHYL ESTER

OCTAMETHYL BUTANE-1,2,3,4-TETRAPHOSPHONATE ESTER

−26.9

ACID

BUTANE-1,2,3,4-TETRAPHOSPHONIC ACID

−26.8

$Na_5H_3$ SALT

PENTASODIUM TRIHYDROGEN BUTANE-1,2,3,4-TETRAPHOSPHONATE SALT

−23.9

EDPl2 – Ethane-1,2-diphosphonate
STP — Sodium tripolyphosphate
BTeP — Butane-1,2,3,4-Tetraphosphonate United States Patent Office 3,755,504
Patented Aug. 28, 1973

3,755,504
BUTANE-1,2,3,4-TETRAPHOSPHONIC LOWER ALKYL ESTERS AND PROCESS FOR SAME
D. Allan Nicholson, Springfield Township, Hamilton County, and Darrel Campbell, Fairfield, Ohio, assignors to The Procter & Gamble Company, Cincinnati, Ohio
Original application Dec. 27, 1967, Ser. No. 694,003. Divided and this application Aug. 26, 1970, Ser. No. 67,200
Int. Cl. C07f 9/40; C11d 1/12
U.S. Cl. 260—932          6 Claims

ABSTRACT OF THE DISCLOSURE

A class of vicinal polyphosphonates, butane-1,2,3,4-tetraphosphonates are prepared by reacting a butyne compound such as 2-butyne-1,4-diol, a hydrogen dialkyl phosphite, and an alkali metal promoter such as sodium at a temperature of about 20° C.–100° C. for from about 30 minutes to about 60 hours. The novel class of compounds consist of butane tetraphosphonic acid,

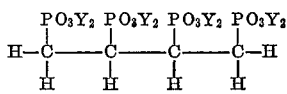

Figure 1:
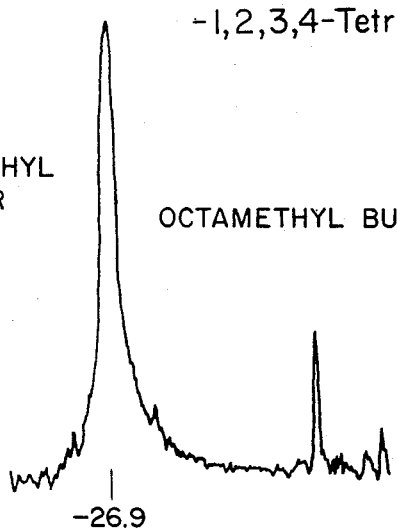
Figure 1:
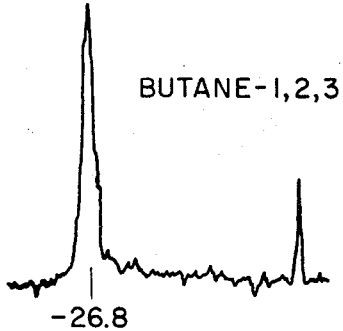
Figure 1:
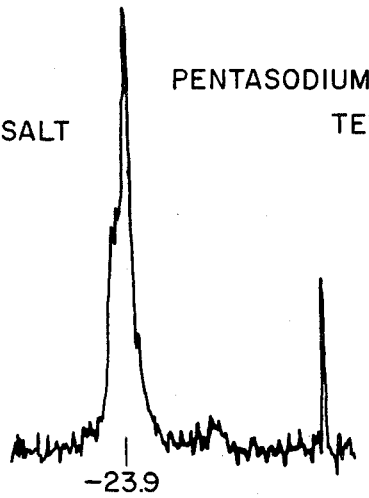

lower alkyl esters, and alkali metal salts thereof. The compounds are useful as detergency builders, sequestering agents and anti-calculus agents in oral compositions.

CROSS REFERENCE TO RELATED APPLICATION

This is a divison of application Ser. No. 694,003, filed Dec. 27, 1967 and now abandoned.

BACKGROUND OF THE INVENTION (1) Field of the invention

This invention pertains to vicinal polyphosphonates as a new class of organic phosphorus-containing compounds, and a novel process for their preparation. The process is described in its broadest terms of preparing butane-1,2,3,4-tetraphosphonic acid which is readily converted to an ester compound by reaction with a trialkyl orthoformate or to an alkali metal salt by reaction with a suitable base such as sodium hydroxide, potassium hydroxide and the like.

(2) Description of the prior art

Organic polyphosphonates are known in the prior art which are gem-diphosphonates, such as methanediphosphonic acid, $CH_2PO_3H_2$, e.g., U.S. Pat. 3,213,030; ethane-1-hydroxy-1,1-diphosphonic acid, $CH_3C(OH)PO_3H_2$, e.g., U.S. Pat. 3,159,581. In addition, other polyphosphonates are known in which a phosphonate group is attached to each of the terminal carbons of a long chain aliphatic compound, e.g. $CH_2(PO_3H_2)(CH_2)_nCH_2(PO_3H_2)$, e.g., U.S. Pat. 3,297,578.

However, no prior art butane compound is known, in which a single phosphonate group is attached to each of the four carbon atoms. The present invention provides this class of compounds for the first time, together with a novel process for preparing such compounds. The novel properties of these compounds are also described and useful application based on these properties are demonstrated and discussed.

SUMMARY OF THE INVENTION AND DESCRIPTION OF PREFERRED EMBODIMENTS

The present invention relates to and provides a new class of compounds having the following formula

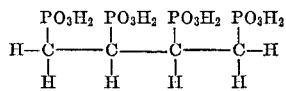

in which Y represents hydrogen, a lower alkyl radical containing from 1 to about 6 carbon atoms, or a water soluble alkali metal.

In the formula above, Y can be hydrogen, and the resulting compound is butane-1,2,3,4-tetraphosphonic acid; Y can also be a lower alkyl radical containing from 1 to about 6 carbon atoms such as methyl, ethyl, n-propyl, isopropyl, n-butyl, isobutyl, n-pentyl, iso-pentyl, n-hexyl, isohexyl, and the like. Such compounds are lower alkyl esters in which the alkyl group can be straight chain or branch chain as noted in the preceding list. Illustrative ester compounds are octamethyl butane-1,2,3,4-tetraphosphonate; octaethyl butane-1,2,3,4-tetraphosphonate; octapropyl butane-1,2,3,4-tetraphosphonate; octaisopropyl butane-1,2,3, 4 - tetraphosphonate; octabutyl butane-1,2,3,4-tetraphosphonate octapentyl butane-1,2,3,4-tetraphosphonate; octahexyl butane-1,2,3,4-tetraphosphonate and the like. Y can also be alkali metal such as sodium, potassium, or lithium in which form the new compounds are salts. Illustrative examples of such salts are: monosodium heptahydrogen butane-1,2,3,4-tetraphosphonate; disodium hexahydrogen butane-1,2,3,4-tetraphosphonate; trisodium pentahydrogen butane-1,2,3,4-tetraphosphonate; tetrasodium tetrahydrogen butane-1,2,3,4-tetraphosphonate; pentasodium trihydrogen butane-1,2,3,4-tetraphosphonate; hexasodium dihydrogen butane-1,2,3,4-tetraphosphonate; heptasodium monohydrogen butane-1,2,3,4-tetraphosphonate; octasodium butane-1,2,3,4-tetraphosphonate; as well as the corresponding potassium and lithium compounds.

The compounds of the present invention, including the aforementioned salts and acids, are useful as detergency builders; and, in addition, as a class of compounds, they possess valuable sequestering and solubility properties which make possible their use in numerous industrial and household applications.

An especially useful embodiment of the present invention comprises built detergent compositions in which the novel compounds, especially the acid and alkali metal salts thereof, are employed as detergency builders for a wide variety of organic detergents including soap and non-soap anionic synthetic detergents, nonionic, ampholytic, and zwitterionic synthetic detergents.

The sequestering properties of the compounds of the invention make possible their use as additives to water supplies in which hardness-imparting ions such as calcium, magnesium, iron and the like represent a problem. It is well known that there are many industrial and household areas in which metal contaminants, even in trace amounts, represent such problems. A comprehensive discussion of properties and applications of sequestering agents is found in a text authored by Stanley Chabarek and Arthur E. Martell, entitled Organic Sequestering Agents (Wiley & Sons, 1959).

According to the present invention, it has now been discovered that vicinal butane,1,2,3,4-tetraphosphonate compounds can be prepared by reacting (A) a compound having a formula $XCH_2—C{\equiv}C—CH_2X$ in which X is selected from the group consisting of bromine, chlorine, iodine, hydroxyl, and ortho-tosyl, (B) a hydrogen dialkyl phosphite ester compound in which the alkyl group is a lower alkyl group containing from 1 to about 6 carbon atoms, and (C) a reaction promoter which is a alkali metal selected from the group consisting of sodium, potassium and lithium, or a hydride thereof.

A general unbalanced equation for the reaction is as follows:

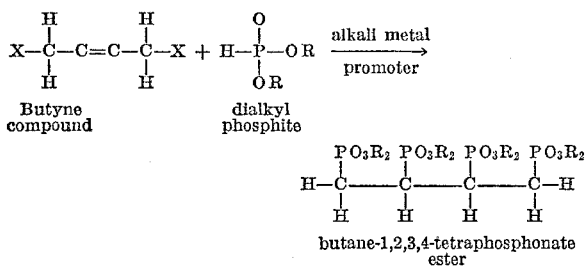

in which X is bromine, chlorine, iodine, hydroxyl or orthotosyl, and R is a lower alkyl group containing from 1 to about 6 carbon atoms, e.g., methyl, ethyl, propyl, isopropyl, n-butyl, iso-butyl, n-pentyl, iso-pentyl, hexyl, and iso-hexyl and the like.

The butyne compound containing the acetylenic bond can be 2-butyne-1,4-dibromide; 2-butyne-1,4-dichloride; 2-butyne-1,4-diiodide; 2-butyne-1,4-diol; and 2-butyne-1,4-di-orthotosylate. The preferred materials are 2-butyne-1,4-diol and 2-butyne-1,4-dibromide. These are commercially available compounds derived from a base catalyzed reaction between acetylene and formaldehyde. The present invention is discussed below in terms of 2-butyne-1,4-diol, $OHCH_2-C\equiv C-CH_2OH$, this compound being chosen merely as representative of the class of starting materials. The term "butyne compound" is also used at times as a matter of convenience when a statement applies broadly to all of the members of the hereinbefore disclosed butyne compounds.

The dialkyl phosphite compounds are liquids at room temperature and are readily available commercially. Illustrative examples are hydrogen dimethyl phosphite, hydrogen diethyl phosphite, hydrogen dipropyl phosphite, hydrogen diisopropyl phosphite, hydrogen dibutyl phosphite, hydrogen diisobutyl phosphite, hydrogen dipentyl phosphite and hydrogen dihexyl phosphite. The preferred compounds are hydrogen dimethyl phosphite, hydrogen diethyl phosphite and hydrogen diisopropyl phosphite.

The reaction requires a promoter which is an alkali metal or an alkali metal hydride. Specifically, the promoter can be sodium, potassium, lithium, sodium hydride, potassium hydride or lithium hydride. For convenience, the term "alkali metal promoter" is used below to encompass both the metals as well as the hydrides thereof.

While it is not absolutely essential to the exercise of the present invention, it is desirable to employ an inert, organic, non-protic solvent such as xylene, toluene, butyl ether or aliphatic saturated hydrocarbons having a boiling point in excess of about 60° C. Included among suitable hydrocarbons are straight chain or branch chain aliphatic compounds containing from about 7 to about 18 carbon atoms. Illustrative examples are heptane, octane, dodecane, tetradecane, octadecane, cycloheptane, cyclodecane, methylcyclohexane and the like. The solvent, in addition to being a solvent for the reaction product, also beneficially serves as a dispersing medium for the alkali metal promoter.

In order to obtain the maximum benefit from the present invention, it is desirable to employ the foregoing reactants and solvent in certain proportions. A clear understanding of the importance of the relative proportions requires a brief description of the theorized mechanics of the reaction. The stoichiometric proportion of the butyne compound and the dialkyl phosphite on a molar basis is 1:4. However, one mole of the dialkyl phosphite reacts with one mole of the alkali metal promoter to form one mole of sodium dialkyl phosphite which is an essential reaction intermediate as explained below. In fact, two moles of the sodium dialkyl phosphite intermediate compound are necessary as described below. Consequently, taking this into consideration, at least 6 moles of the hydrogen dialkyl phosphite should be used per mole of the butyne compound at the outset; greater amounts of the hydrogen dialkyl phosphite can be used but without offering any materal advantage. A useful range of mole proportions of butyne compound to hydrogen dialkyl phosphite is from about 1:6 to about 1:12 respectively, while a preferred range is from about 1:6 to about 1:10, butyne compound to dialkyl phosphite.

The alkali metal promoter has two roles in the reaction; on the one hand, it is a reactant on an equimolar basis with the hydrogen dialkyl phosphite to form sodium dialkyl phosphite which, as noted above, is a necessary material during the course of the reaction. The alkali metal promoter also serves as a promoter or catalyst for the addition of the first two phosphonate groups across the acetylenic bond of the butyne starting material at the outset of the reaction. The amount required to satisfactorily promote this catalyzed addition can be relatively small, i.e., as low as .05 to .3 mole of alkali metal promoter. Larger amounts, i.e., greater than .5 mole can also be used but without any material advantage. There may, in fact, be some slight disadvantage to using more than about .5 equivalent of the promoter because it may then react with reaction intermediates to form undesired by-products and thus decrease the overall yield of the desired tetraphosphonate reaction products. Taking into consideration the amount of alkali metal required (1) to promote or catalyze the diphosphonate addition reaction, and (2) to form the additional sodium dialkyl phosphite which reacts with the abstracted water means that the overall process requires from about 2.05 to about 2.7 moles of alkali metal promoter per mole of butyne compound and, preferably, 2.05 to about 2.5 moles of alkali metal promoter per mole of the butyne compound.

The reaction can be carried out within a temperature range of from about 20° C. to about 100° C. but a range of about 50° C. to about 80° C. is preferred. Temperatures below 20° C. should not be used because the reaction would be too slow thereby necessarily involving inordinately long reaction times; while reaction temperatures above 100° C. can result in decomposition of the reaction product and thereby decrease yields of desired product.

The reaction can take from about 5 minutes to about 60 hours but is preferably completed in from about 30 minutes to about 45 hours.

Although not absolutely essential, there is a preference for stirring the reaction mixture during the reaction, as this affords better contact between the reactants and generally facilitates a smoother, more efficient reaction.

So far as the reaction mechanism is concerned, it was not expected that the third and fourth phosphonate moieties would attach vicinally along the butane chain. Since the exact course of the reaction was unfamiliar, it was theorized that the reaction would probably proceed according to the following equation (using 2-butyne-1,4-diol and hydrogen dialkyl phosphite as an example):

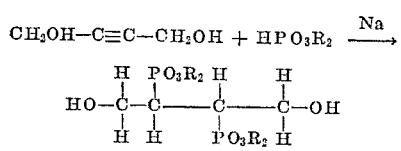

Attempts were made to isolate significant quantities of the dialcohol of a butane diphosphonate intermediate but they were unsuccessful. It was thus unexpectedly discovered that, in the presence of sodium phosphite, the generated dialcohol intermediate rapidly converts to a butane-1,2,3,4-tetraphosphonate ester. It was surprising to discover that water is so rapidly eliminated from the reaction intermediate in such an extremely facile reaction. This rapid dehydration seems to be peculiar to esters of vicinal polyphosphonic acid, at least without using forced reaction conditions.

Following the reaction described above, the butane-1,2,3,4-tetraphosphonate is present in the reaction as an ester. Attempts were made to recover the ester by an ordinary distillation procedure. Such a procedure had been found to be satisfactory for other vicinal polyphosphonates, such as esters of propane-1,2,3,-triphosphonic acid as described in a copending patent application being filed concurrently herewith. It was then discovered that the distillation recovery process was not operable. In order to recover the desired butane-1,2,3,4-tetraphosphonate in substantial yields, it was found necessary to hydrolyze the butane-1,2,3,4-tetraphosphonate lower alkyl ester to butane-1,2,3,4-tetraphosphonic acid, and react the acid with an alkaline earth metal salt (i.e. calcium chloride at a reaction pH of about 6.5 to 8, preferably about 7. Under these conditions, an insoluble salt of butane-1,2,3,4-tetraphosphonic acid is formed which can be easily recovered (e.g., filter, centrifuge). The calcium salt can then be readily converted to pure butane-1,2,3,4-tetraphosphonic acid either by an ordinary reaction with hydrogen chloride or preferably by an ion exchange reaction. The tetraphosphonic acid so formed is easily neutralized to an alkali metal salt or by a suitable reaction with a trialkyl orthoformate converted to a pure ester form.

Prior to discovering this recovery technique, i.e., one which takes advantage of the low solubility of an insoluble alkaline earth metal salt of butane-1,2,3,4-tetraphosphonic acid, several other procedures were attempted unsuccessfully. As mentioned, separation and recovery by distillation was not possible because of the high boiling point of the ester. In addition, the ester could not be conveniently crystallized and recovered. It was then converted to the acid by refluxing with excess concentrated hydrochloric acid. Unfortunately, the tetraphosphonic acid was recovered as a viscous glass, which likewise would not crystallize readily. Attempts to induce sodium, aniline, and cyclohexylamine salts to crystallize also failed. Finally, the separation embodiment of the present invention was discovered according to which a very insoluble alkaline earth metal (e.g., calcium, magnesium) tetraphosphonate is precipitated by reacting the hydrolyzed butane-1,2,3,4-tetraphosphonic acid with an alkaline earth metal salt at a pH in the range of 6.5 to about 8, and preferably about pH 7.

To practice this embodiment of the invention, the butane-1,2,3,4-tetraphosphonate ester in the reaction mixture is hydrolyzed by any known manner. For instance, the hydrolysis can be performed by adding from about 8 to about 20 equivalents of hydrogen chloride to the mixture and heating to a temperature in the range of from about 60 to 100° C., preferably 80 to 100° C. for from about 1 to 4 hours, preferably 3 to 4 hours.

The hydrolyzed butane-1,2,3,4-tetraphosphonic acid is then reacted with an inorganic alkaline earth metal salt, such as calcium chloride, in a reaction medium having a pH in the range of about 6.0 to about 8.0 and preferably 6.5 to 7.5.

Since the hydrolyzed acid renders the reaction mixture to be acid, it is necessary to adjust the pH of the reaction mixture to the necessary range by adding sufficient base, such as sodium hydroxide. It is immaterial whether the alkaline earth metal compound is added to the hydrolyzed acid mixture followed by the pH adjustment step, or, alternatively, if the pH is first adjusted and then the alkaline earth metal compound is added. Either procedure works satisfactorily so that in its broadest terms the essential and novel recovery step comprises reacting butane-1,2,3,4-tetraphosphonic acid with an alkaline earth metal compound in a reaction solution having a pH in the range of about 6–8 and preferably 6.5 to 7.5. If the alkaline earth metal compound is added to the acid solution, the reaction solution remains clear until the pH is adjusted, i.e., until the sodium hydroxide is added to render the pH to the proper range. Similarly, the acid solution remains clear during the pH adjustment step, and only becomes cloudy upon addition of the alkaline earth metal compound, e.g., calcium chloride.

The amount of alkaline earth compound required is in the range of from about 2.0 to about 4 equivalents, preferably from about 2.0 to about 3.0 equivalents of said alkaline earth metal compound per each equivalent of ester remaining after distillation. Sufficient base should be used to provide a pH of about 6.0 to about 8.0, preferably about 7.0. This adjustment will require varying amounts of base, within the range of from about 4 equivalents to about 6 equivalents of base per each equivalent of ester remaining after distillation.

The calcium salt which is formed is very insoluble and quickly precipitates out. Separation, as mentioned, is by ordinary means, e.g., filter, centrifuge. The separated calcium salt is converted to a free acid by either of two ways; (1) adding hydrochloride to dissolve the calcium butane-1,2,3,4-tetraphosphonate, followed by an ion exchange reaction with a hydrogen cation exchange resin, or (2) by simply ion exchanging the calcium salt directly. This latter embodiment is a preferred embodiment. In order to convert the calcium salt form to a form in which it can be treated in an ion exchange step, a small portion of the alkaline earth metal salt, e.g., calcium salt, is mixed with enough of the hydrogen ion exchange resin to get it into solution. This is followed by a routine ion exchange from which pure butane-1,2,3,4-tetraphosphonic acid is obtained.

If the recovery step of dissolving the calcium salt with hydrogen chloride prior to ion exchanging is used, hydrogen chloride will also be present in the ion-exchanged product. This hydrogen chloride can be easily stripped off by evaporation.

The final product in any event is pure butane-1,2,3,4-tetraphosphonic acid which can be reacted with a suitable base to convert it to an alkali metal salt or it can be reacted with a trialkyl orthoformate to form an ester of butane-1,2,3,4-tetraphosphonate.

In the practice of this process, it is possible to practice a purification procedure which comprises repeating the $CaCl_2$/NaOH precipitation procedure several times.

Referring back to that portion of this description in which the reaction is described, it is pointed out that it is possible that during the reaction some sodium replacement of ester groups may occur. This will tend to occur above about 70° C. and will hold down the yield of the desired ester formation to the extent that it does occur. There is now described a preferred embodiment of this invention according to which the maximum yield of the desired butane-1,2,3,4-tetraphosphonate ester is formed and subsequently recovered by the technique described above of forming a precipitate of a very insoluble calcium salt of butane-1,2,3,4-tetraphosphonic acid.

This preferred embodiment calls for the additional reaction steps of evaporating the organic solvent from the reaction mixture, dissolving the reaction mixture in water, passing the aqueous solution of the reaction mixture through a hydrogen cation exchanger, re-esterifying the ion exchanged reaction mixture by reacting it with a trialkylorthoformate, the alkyl group being a lower alkyl group which is the same as the alkyl group in the hydrogen dialkylphosphite starting reactant.

The re-esterified reaction product formed in this manner is then distilled to about 170° C. to remove unreacted hydrogen dialkylphosphite, leaving behind in the pot residue a crude reaction solution of butane-1,2,3,4-tetraphosphonate ester. It is this crude ester reaction solution which is hydrolyzed to the acid and recovered via the insoluble alkaline earth metal precipitate route described in detail above.

According to this preferred embodiment which assures the recovery of maximum amounts of the desired butane-1,2,3,4-tetraphosphonate compounds, the organic reaction solvent can be evaporated by any suitable means including distilling it off. The distillation or evaporation step can be performed within a temperature range of about 20° C. to about 120° C., preferably 40° to 100° C., and usually requires from about 20 minutes to 5 hours, preferably 40 minutes to 2 hours.

The desired reaction mixture is then dissolved in water. The amount of water used is immaterial, since only enough should be used to dissolve the reaction mixture. The amount of water used can be in the range of from about ½ to about 100 times the volume of the phosphonate ester; the preferred range being from about 2 to about 5 times the volume of the phosphonate ester.

The aqueous solution of the reaction mixture can be comprised of butane-1,2,3,4-tetraphosphonate ester, any partial sodium salts of the butane-1,2,3,4-tetraphosphonate ester as described above, sodium hydroxide, any hydrogen dialkylphosphite which was not removed during evaporation of the organic solvent, sodium hydrogen monoalkylphosphite partial salt, and possibly some butane mono-, di-, tri-phosphonate intermediate reaction products.

This aqueous solution is passed through a hydrogen cation ion exchanger such as a sulfonated hydrocarbon type, e.g., Dowex–50–X8 ion exchange resin, marketed by Dow Chemical Company. A great number of cation exchange resins have been synthesized and are commercially available having a variety of cationic groups, e.g., —OH, —COOH, —SO₃H, —CH₂SO₃H. Any such ion exchange resins can be used; the only distinction between any of them for purposes of the present invention is that some may be more effective than others. All hydrogen cation exchangers, however, should be operable. As a result of the hydrogen cation exchange step, the resulting reaction mixture will have all of the sodium replaced with hydrogen. The water may then be evaporated and the reaction mixture can be re-esterified by reacting with a trialkyl orthoformate, the alkyl group containing from 1 to about 6 carbon atoms. Preferably, the alkyl group of the re-esterifying agent should be the same as the alkyl groups of the starting hydrogen dialkylphosphite. This will simplify the recovery step and also will provide for smoother conversion of the esters to the free tetraphosphonic acids. There is no advantage to having a mixed ester group. The trialkyl orthoformate compound can be trimethyl orthoformate, triethyl orthoformate, tripropyl orthoformate, triisopropyl orthoformate, tributyl orthoformate, tripentyl orthoformate, trihexyl orthoformate, and the like.

In the ordinary practice of the present invention, it is difficult to determine exactly how much, if any, ester replacement by sodium occurs during the reaction. Full advantage of the invention can be enjoyed by using an amount of trialkyl orthoformate corresponding to an equimolar molar basis of the alkali metal promoter which is used. In other words, since the reaction as defined calls for from about 1.05 to 1.7 moles of alkali metal promoter, this same range applied to the esterifying agent. More than this amount of esterifying agent can be used, if desired, to make absolutely certain that complete re-esterification takes place. To add this extra precaution, the amount of re-esterifying agent should be in the range of 2.05 to 2.7 moles of agent.

Following the re-esterification step, the acids (hydrogens) are all converted to the ester forms. There is thus present the octaalkyl ester of butane-1,2,3,4-tetraphosphonic acid which can be easily recovered by the distillation procedure previously described. Lower alcohols, e.g., ethyl alcohol, and alkyl formate are also formed during the re-esterification step.

By employing the foregoing re-esterification procedure, it is possible to increase the yield from 5 to 60%, and even higher. The improved yield which can be gained by using the additional recovery steps will depend upon how much ester replacement by sodium occurs during the initial reaction. For instance, within the given temperature range of 20° C. to 100° C., very little ester replacement occurs below 60° C. Consequently, if the reaction temperature is maintained below 60° C., there will be little advantage to be gained from employing the ion exchange/re-esterification steps. However, if the reaction temperature is allowed to reach temperatures up to 100° C., then the additional embodiment for increased yields may be very desirable. The ester replacement by the sodium ion can be thought of in terms of the following simplified illustration:

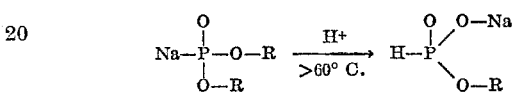

By employing this procedure, a compound in excess of 95% purity (by $P^{31}MR$ and thin layer chromatography) is obtained. Ion exchanging to replace the alkaline earth metal ion by hydrogen leads to the pure butane-1,2,3,4-tetraphosphonic acid.

The preferred alkaline earth metal compounds to react with the ester of butane-1,2,3,4-tetraphosphonic acid in the reaction mixture are calcium chloride and magnesium chloride. Other salts can also be used such as the nitrate and sulfates of calcium and magnesium.

EXAMPLE I

The reaction apparatus consisted of a two liter, three neck flask which was fitted with a mechanical stirrer in the center neck; an offset addition funnel leading to an Allihn condenser in one neck; and in the other neck a "Y" adapter leading to a thermometer and a gas inlet tube. All equipment was baked at 110° C. for 30 minutes prior to assembly, and a stream of dry nitrogen was bled through the apparatus during the reaction.

1.5 moles (34.5 gms.) of sodium was reacted with 4 moles (552.4 gms.) of $HPO_3Et_2$ in a liter of toluene solvent. One mole (86.1 gms.) of solid 2-butyne-1,4-diol was cautiously added to the reaction mixture. A cool water bath was used to keep the temperature of the very exothermic reaction at less than 70° C. as ¾ of the diol was added. However, addition of the last ¼ of the solid gave no additional evolution of heat. After heating for 16 hours at 70–80° C., a sample was removed and a $P^{31}MR$ spectrum obtained. The spectrum showed: 20% at —30.0 p.p.m.; 15% at —27.0 p.p.m; 13% at —16.7 p.p.m; 8% at —12.0 p.p.m; and the rest a doublet at —7.1 p.p.m., J=333 c.p.s. ($HPO_3Et_2$). This indicates that the reaction is not yet completed.

An additional one mole of $NaOP(OEt)_2$ was prepared, using the same procedure as before, and this solution added over a 15 minute period to the above product. Cooling with an acetone-Dry Ice bath was required to keep the reaction temperature at less than 40° C. during this time. The solution was then heated to 70° C. for 16 hours and to 90° C. for one more hour before the reaction product was stopped. A $P^{31}MR$ spectrum of the reaction product showed: 24% $HPO_3Et_2$ (doublet at —6.9 p.p.m., J=340 c.p.s.); 43% at —30.3 p.p.m. of the ester of butane-1,2,3,4-tetraphosphonic acid; and 12% at —16.9 p.p.m. The yield of the ester was 53.8%.

After the solvent was removed by vacuum distillation, the reaction product was dissolved in water and eluted through Dowex 50-W-X8 in exchange resin (H⁺ form) to replace sodium metal ions by hydrogen. The acidic solution was evaporated under vacuum to constant volume and azeotroped 3 times with 150 ml. of isopropanol to render it anhydrous. The resulting dried mixture was then boiled with triethylorthoformate (370 gms., 2.5 moles) for 5 hours to re-esterify the acid groups. The excess HC(OEt)$_3$ and HPO$_3$Et$_2$ were removed by distilling at temperatures up to 70° C. at 1 mm. Hg pressure to leave a light brown viscous mass, P$^{31}$MR at −26.9 p.p.m.; which was predominantly octaethyl butane-1,2,3,4-tetraphosphonate.

The ester was converted to an acid by refluxing with excess concentrated hydrochloric acid for 4½ hours. The hydrolyzed acid solution was concentrated under vacuum to leave the butane-1,2,3,4-tetraphosphonic acid, which was then redissolved in a liter of water containing excess CaCl$_2$ (500 gms.). Dilute NaOH was slowly added with vigorous stirring to titrate to pH 7.0. A precipitate formed upon addition of the NaOH which was filtered. The recovered solid was stirred with 1.7 liters of boiling H$_2$O for 2 hours and filtered while hot. This was done to remove any soluble salts which may be present. This leaching process was repeated twice more. The water-insoluble solid was slurried in water and ion exchanged with Dowex 50-W-XB (H+ form) and again titrated, in 1.3 liters of H$_2$O, to pH 7.0 with NaOH. Excess CaCl$_2$ solution was slowly added to the hot solution with vigorous stirring to precipitate a white solid in the same manner as before. This solid was removed by filtration and redissolved in 1.5 liters of H$_2$O by adding HCl. Dilute NaOH was added over a 1 hour period to titrate back to pH 7.0 and to reform the white precipitate, again filtered while hot. Analysis of the purified calcium butane-1,2,3,4-tetraphosphonate salt gave 20.2% Ca, <0.1% Na.

The purified calcium salt was converted to butane-1,2,3,4-tetraphosphonic acid by ion exchanging.

The butane-1,2,3,4-tetraphosphonic acid was combined with 5 equivalents of NaOH to prepare the Na$_5$H$_3$ salt. This hygroscopic salt was recovered by simply evaporating to dryness.

*Analysis.*—Calcd. for C$_4$H$_9$O$_{12}$P$_4$Na$_5$ (percent): C, 9.85; H, 1.86; P, 25.39; Na, 23.56. Found (percent): C, 10.1; H, 2.3; P, 25.7; Na, 23.6.

EXAMPLE II

Reaction apparatus and technique used for this preparation was the same as in Example I.

2.5 moles of sodium (57.5 gms.) was reacted with 4 moles, 55.2 gms., of diethyl phosphite in 400 ml. of toluene at 30-40° C. One mole, 86.1 gms., of 2-butyne-1,4-diol was added as a liquid melt from a heated addition funnel. The exothermic reaction was kept at less than 75° during the addition. The solution was then kept heated 75-80° for 16 hours.

Isolation of product

The toluene solvent was distilled off and the residual material refluxed for 4 hours with excess concentrated HCl. Insoluble sodium chloride was filtered before the acidic solution was evaporated to dryness. The resulting butane-1,2,3,4-tetraphosphonic acid was redissolved in water and eluted through Dowex–50W–X8 (H+ form) ion exchange resin to remove any remaining sodium ions. Partial purification of the butane-1,2,3,4-tetraphosphonic acid was accomplished by titration to pH 4.9 with a water solution of Mg(OH)$_2$, then to pH 6.2 with NaOH, giving the white precipitate of the magnesium salt of butane-1,2,3,4-tetraphosphonic acid during the latter titration. Recrystallization of the resulting magnesium salt was accomplished by dissolving it in dilute HCl and again raising the pH with sodium hydroxide to about pH 6. Final purification of the butane-1,2,3,4-tetraphosphonic acid was accomplished by ion exchanging the recovered magnesium salt (again dissolved in dilute HCl) with Dowex–50W–X8 exchange resin in the H+ form, and crystallizing the resulting butane-1,2,3,4-tetraphosphonic acid from a concentrated water solution.

*Analysis.*—Calcd. for C$_4$H$_{14}$O$_{12}$P$_4$ (percent): C, 12.7; H, 3.7; P, 32.8. Found (percent): C, 12.8; H, 4.0; P, 32.0; H$_2$O, 2.4. Converted to anhydrous basis; C, 13.2; H, 4.0; P, 32.0.

Another of the surprising discoveries of the present invention is the remarkable detergency building property of the novel butane-1,2,3,4-tetraphosphonate compounds described above. The magnitude of the cleaning advantage over previously known organic and inorganic detergency builder compounds was totally unexpected. As a result of this discovery, one of the more important embodiments of the present invention is a detergent composition which contains a butane-1,2,3,4-tetraphosphonate compound as a builder component in the complete formulation.

Built detergent compositions ranging from lightly built to medium built to heavily built have been available for several years. These compositions most generally are in the form of solids and liquids and are used for light, medium, or heavy duty laundering uses. The meaning of the terms lightly built, medium built, and heavily built are derived from the relative amount of builder which is present in the total formulation; and the concept behind built detergent compositions is based on the knowledge that when certain substances are added to the active detergent component or components of washing compositions, an increase in cleaning ability or whiteness maintenance, or both, is obtained, even though the washing solution used may contain less of the active detergent. Substances capable of producing this effect are known as builders, and it is in this context that the butane-1,2,3,4-tetraphosphonate compounds of the present invention are especially valuable. Light duty detergent compositions are those used for washing fine fabrics or highly soiled fabrics. Filder conditions are generally used in light duty applications, such as, for instance, cool or warm water and only slight wringing or agitating. Dishwashing compositions can also be considered as light duty detergent compositions. Heavy duty laundering compositions, on the other hand, are those intended for washing heavily soiled fabrics such as are generally found in an ordinary household wash. Medium duty laundering compositions can alternatively be used for dishwashing, fine fabric laundering, or even for washing fairly heavily soiled fabrics.

It is surprising that the compounds of the present invention find such wide applications as those listed above. It was equally as surprising, however, to discover that in formulating detergent compositions described above, the active detergent portion of the complete compositions could be virtually any of the known or commercially available surface active detergent compounds. In its broadest terms, therefore, this embodiment of the present invention contemplates a detergent composition comprising an active detergent portion which can be any surface active compound having useful detergent properties and an effective amount of a builder comprised of the butane-1,2,3,4-tetraphosphonate compounds described herein.

It is to be noted that while an active detergent or a mixture of detergent compounds represent an essential and indispensable ingredient in the detergent compositions presently being contemplated, the major discovery resides in the useful builder properties of the butane-1,2,3,4-tetraphosphonate compounds.

According to the present invention, a detergent composition should contain an active detergent ingredient and a butane-1,2,3,4-tetraphosphonate builder in a ratio, by weight, of from about 2:1 to about 1:10 and, preferably, in a weight ratio of deteregnt to builder of from 1:1 to about 1:6. It is customary to speak of the ingredients in detergent compositions as being by weight. By way of example, a detergent composition prepared according to the present invention in which the active to builder ratio is about 2:1 or 1:1 on a weight basis is especially useful as a dishwashing composition or a fine fabric laundering composition. A detergent composition comprising active detergent to builder ratio of 1:1.5 or 1:1.9 has excellent performance characteristics for washing lightly soiled items in an ordinary household wash. Yet further by way of illustration, heavily soiled fabrics are best laundered with detergent compositions in which the active detergent to builder ratio is from about 1:2 to about 1:10.

It will be seen, therefore, that in practicing the present invention, it is only necessary to mix at least one surface active detergent compound having the desired sudsing, cleaning, mildness characteristics and the like, with an effective amount of a butane-1,2,3,4-tetraphosphonate builder compound in the useful by-weight proportions set forth above.

The active detergent ingredients can include anionic, nonionic, ampholytic and zwitterionic detergent compounds, or mixtures of compounds selected from these general classes of detergents. Each of these classes is illustrated at length as follows:

(A) Anionic soap and non-soap synthetic detergents

This class of detergents includes ordinary alkali metal soaps such as the sodium, potassium, ammonium and alkylolammonium salts of higher fatty acids containing from about 8 to about 24 carbon atoms and preferably from about 10 to about 20 carbon atoms. Suitable fatty acids can be obtained from natural sources such as, for instance, from plant or animal esters (e.g., palm oil, coconut oil, babassu oil, soybean oil, castor oil, tallow, whale and fish oils, grease, lard, and mixtures thereof). The fatty acids can also be synthetically prepared (e.g., by the oxidation of petroleum, or by hydrogenation of carbon monoxide by the Fischer-Tropsch process). Resin acids are suitable such as rosin and those resin acids in tall oil. Napthenic acids are also suitable. Sodium and potassium soaps can be made by direct saponification of the fats and oils or by the neutralization of the free fatty acids which are prepared in a separate manufacturing process. Particularly useful are the sodium and potassium salts of the mixtures of fatty acids derived from coconut oil and tallow, i.e., sodium or potassium tallow and coconut soap.

This class of detergents also includes water-soluble salts, particularly the alkali metal salts of organic sulfuric reaction products having in their molecular structure an alkyl radical containing from about 8 to about 22 carbon atoms and a sulfonic acid or sulfuric acid ester radical. (Included in the term alkyl is the alkyl portion of higher acyl radicals.) Examples of this group of synthetic detergents which form a part of the preferred built detergent compositions of the present invention are the sodium or potassium alkyl sulfates, especially those obtained by sulfating the higher alcohols ($C_8$–$C_{18}$ carbon atoms) produced by reducing the glycerides of tallow or coconut oil; sodium or potassium alkyl benzene sulfonates, in which the alkyl group contains from about 9 to about 15 carbon atoms, in straight chain or branched chain configuration, e.g., those of the type described in United States Letters Patents Nos. 2,220,099 and 2,477,383 (especially valuable are linear straight chain alkyl benzene sulfonates in which the average of the alkyl groups is about 13 carbon atoms abbreviated hereinafter as $C_{13}$LAS); sodium alkyl glyceryl ether sulfonates, especially those ethers of higher alcohols derived from tallow and coconut oil; sodium coconut oil fatty acid monoglyceride sulfonates and sulfates; sodium or potassium salts of sulfuric acid esters of the reaction product of one mole of a higher fatty alcohol (e.g., tallow or coconut oil alcohols) and about 1 to 6 moles of ethylene oxide; sodium or potassium salts of alkyl phenol ethylene oxide ether sulfate with about 1 to about 10 units of ethylene oxide per molecule and in which the alkyl radicals contain about 8 to about 12 carbon atoms.

Additional examples of anionic non-soap synthetic detergents which come within the terms of the present invention are the reaction product of fatty acids esterified with isothionic acid and neutralized with sodium hydroxide where, for example, the fatty acids are derived from coconut oil; sodium or potassium salts of fatty acid amide of methyl tauride in which the fatty acids, for example, are derived from coconut oil. Other anionic synthetic detergents of this variety are set forth in United States Letters Patents 2,486,921; 2,486,922; and 2,396,278.

Still other anionic synthetic detergents include the class designated as succinamates. This class includes such surface active agents as disodium N-octadecylsulfo succinamate; tetrasodium N-(1,2-dicarboxyethyl)-N-octadecyl-sulfo-succinamate; diamyl ester of sodium sulfosuccinic acid; dihexyl ester of sodium sulfosuccinic acid; dioctyl ester of sodium sulfosuccinic acid.

Anionic phosphate surfactants are also useful in the present invention. These are surface active materials having substantial detergent capability in which the anionic solubilizing group connecting hydrophobic moieties is an oxy acid of phosphorus. The more common solubilizing groups, of course, are —$SO_4H$, —$SO_3H$, and —$CO_2H$. Alkyl phosphate esters such as $(R—O)_2PO_2H$ and $ROPO_3H_2$ in which R represents an alkyl chain containing from about 8 to about 20 carbon atoms are useful.

These esters can be modified by including in the molecule from one to about 40 alkylene oxide units, e.g., ethylene oxide units. Formulae for these modified phosphate anionic detergents are

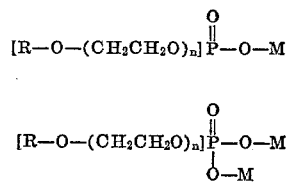

in which R represents an alkyl group containing from about 8 to 20 carbon atoms, or an alkylphenyl group in which the alkyl group contains from about 8 to 20 carbon atoms, and M represents a soluble cation such as hydrogen, sodium, potassium, ammonium or substituted ammonium; and in which $n$ is an integal from 1 to about 40.

A specific anionic detergent which has also been found excellent for use in the present invention is described more fully in the U.S. Pat. 3,332,880 of Phillip F. Pflaumer and Adriaan Kessler, issued July 25, 1967, titled Detergent Composition. This detergent comprises by weight from about 30% to about 70% of Component A, from about 20% to about 70% of Component B, and from about 2% to about 15% of Component C, wherein:

(a) Said Component A is a mixture of double-bond positional isomers of water soluble salts of alkene-1-sulfonic acids containing from about 10 to about 24 carbon atoms, said mixture of positional isomers including about 10% to about 25% of an alpha-beta unsaturated isomer, about 30% to about 70% of a beta-gamma unsaturated isomer, about 5% to about 25% of a gamma-delta unsaturated isomer, and about 5% to about 10% of a delta-epsilon unsaturated isomer;

(b) Said Component B is a mixture of water soluble salts of bifunctionally-substituted sulfur-containing saturated aliphatic compounds containing from about 10 to about 24 carbon atoms, the functional units being hydroxy and sulfonate radicals with the sulfonate radical always being on the terminal carbon and the hydroxyl radical being attached to a carbon atom at least two carbon atoms removed from the terminal carbon atom, at least 90% of the hydroxy radical substitutions being in the 3, 4, and 5 positions; and (c) Said Component C is a mixture comprising from about 30–95% water soluble salts of alkene disulfonates containing from about 10 to about 24 carbon atoms, and from about 5% to about 70% water soluble salts of hydroxy disulfonates containing from about 10 to about 24 carbon atoms, said alkene disulfonates containing a sulfonate group attached to a terminal carbon atom and a second sulfonate group attached to an internal carbon atom not more than about six carbon atoms removed from said terminal carbon atom, the alkene double bond being distributed between the terminal carbon atom and about the seventh carbon atom, said hydroxy disulfonates being saturated aliphatic compounds having a sulfonate radical attached to a terminal carbon, a second sulfonate group attached to an internal carbon atom not more than about six carbon atoms removed from said terminal carbon atom, and a hydroxy group attached to a carbon atom which is not more than about four carbon atoms removed from the site of attachment of said second sulfonate group.

(B) Nonionic synthetic detergents

Nonionic synthetic detergents may be broadly defined as compounds produced by the condensation of alkylene oxide groups (hydrophilic in nature) with an organic hydrophobic compound, which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements.

For example, a well known class of nonionic synthetic detergents is made available on the market under the trade name of "Pluronic." These compounds are formed by condensing ethylene oxide with a hydrophobic base formed by the condensation of propylene oxide with propylene glycol. The hyrophobic portion of the molecule which, of course, exhibits water insolubility, has a molecular weight of from about 1500 to 1800. The addition of polyoxyethylene radicals to this hydrophobic portion tends to increase the water solubility of the molecule as a whole and the liquid character of the product is retained up to the point where polyoxyethylene content is about 50% of the total weight of the condensation product.

Other suitable nonionic synthetic detergents include:

(1) The polyethylene oxide condensates of alkyl phenols, e.g., the condensation products of alkyl phenols having an alkyl group containing from about 6 to 12 carbon atoms in either a straight chain or branched chain configuration, with ethylene oxide, the said ethylene oxide being present in amounts equal to 5 to 25 moles of ethylene oxide per mole of alkyl phenol. The alkyl substituent in such compounds may be derived from polymerized propylene, diisobutylene, octene, or nonene, for example.

(2) Those derived from the condensation of ethylene oxide with the product resulting from the reaction of propylene oxide and ethylene diamine, for example, compounds containing from about 40% to about 80% polyoxyethylene by weight and having a molecular weight of from about 5,000 to about 11,000 resulting from the reaction of ethylene oxide groups with a hydrophobic base constituted of the reaction product of ethylene diamine and excess propylene oxide, said base having a molecular weight of the order of 2,500 to 3,000, are satisfactory.

(3) The condensation product of aliphatic alcohols having from 8 to 22 carbon atoms, in either straight chain or branched chain configuration, with ethylene oxide, e.g., a coconut alcohol-ethylene oxide condensate having from 5 to 30 moles of ethylene oxide per mole of coconut alcohol, the coconut alcohol fraction having from 10 to 14 carbon atoms.

(4) Nonionic detergents include nonyl phenol condensed with either about 10 or about 30 moles of ethylene oxide per mole of phenol and the condensation products of coconut alcohol with an average of either about 5.5 or about 15 moles of ethylene oxide per mole of alcohol and the condensation product of about 15 moles of ethylene oxide with one mole of tridecanol.

Other examples include dodecylphenol condensed with 12 moles of ethylene oxide per mole of phenol; dinonylphenol condensed with 15 moles of ethylene oxide per mole of phenol; dodecyl mercaptan condensed with 10 moles of ethylene oxide per mole of mercaptan; bis-(N-2-hydroxyethyl) lauramide; nonyl phenol condensed with 20 moles of ethylene oxide per mole of nonyl phenol; myristyl alcohol condensed with 10 moles of ethylene oxide per mole of myristyl alcohol; lauramide condensed with 15 moles of ethylene oxide per mole of lauramide; and di-isooctylphenol condensed with 15 moles of ethylene oxide.

(5) A detergent having the formula $R^1R^2R^3N \rightarrow O$ (amine oxide detergent) wherein $R^1$ is an alkyl group containing from about 10 to about 28 carbon atoms, from 0 to about 2 hydroxy groups and from 0 to about 5 ether linkages, there being at least one moiety of $R^1$ which is an alkyl group containing from about 10 to about 18 carbon atoms and 0 other linkages, and each $R^2$ and $R^3$ are selected from the group consisting of alkyl radicals and hydroxyalkyl radicals containing from 1 to about 3 carbon atoms;

Specific examples of amine oxide detergents include:

dimethyldodecylamine oxide
dimethyltetradecylamine oxide
ethylmethyltetradecylamine oxide
cetyldimethylamine oxide
dimethylstearylamine oxide
cetylethylpropylamine oxide
diethyldodecylamine oxide
diethyltetradecylamine oxide
dipropyldodecylamine oxide
bis-(2-hydroxyethyl)dodecylamine oxide
bis-(2-hydroxyethyl)-3-dodecoxy-1-hydroxypropyl amine oxide
(2-hydroxypropyl)methyltetradecylamine oxide
dimethyloleylamine oxide
dimethyl-(2-hydroxydodecyl)amine oxide and the corresponding decyl, hexadecyl and octadecyl homologs of the above compounds.

(6) A detergent having the formula $R^1R^2R^3P \rightarrow O$ (phosphine oxide detergent) wherein $R'$ is an alkyl group containing from about 10 to about 28 carbon atoms, from 0 to about 2 hydroxy groups and from 0 to about 5 ether linkages, there being at least one moiety of $R'$ which is an alkyl group containing from about 10 to about 18 carbon atoms and 0 ether linkages, and each of $R^2$ and $R^3$ are selected from the group consisting of alkyl radicals and hydroxyalkyl radicals containing from 1 to about 3 carbon atoms.

Specific examples of the phosphine oxide detergents include:

dimethyldodecylphosphine oxide
dimethyltetradecylphosphine oxide
ethylmethyltetradecylphosphine oxide
cetyldimethylphosphine oxide
dimethylstearylphosphine oxide
cetylethylpropylphosphine oxide
diethyldodecylphosphine oxide
diethyltetradecylphosphine oxide
dipropyldodecylphosphine oxide
bis-(hydroxymethyl)dodecylphosphine oxide
bis-(2-hydroxyethyl)dodecylphosphine oxide
(2-hydroxypropyl)methyltetradecylphosphine oxide
dimethyloleylphosphine oxide, and
dimethyl-(2-hydroxydodecyl)phosphine oxide and the corresponding decyl, hexadecyl, and octadecyl homologs of the above comounds.

(7) a detergent having the formula

(sulfoxide detergent) wherein $R^1$ is an alkl radical containing from about 10 to about 28 carbon atoms, from 0 to about 5 ether linkages and from 0 to about 2 hydroxyl substituents at least one moiety of $R^1$ being an alkyl radical containing 0 ether linkages and containing from about 10 to about 18 carbon atoms, and wherein $R^2$ is an alkyl radical containing from 1 to 3 carbon atoms and from one to two hydroxyl groups.

octadecyl methyl sulfoxide
dodecyl methyl sulfoxide
tetradecyl methyl sulfoxide
3-hydroxytridecyl methyl sulfoxide
3-methoxytridecyl methyl sulfoxide
3-hydroxy-4-dodecoxybutyl methyl sulfoxide
octadecyl 2-hydroxyethyl sulfoxide
dodecylethyl sulfoxide (C) Ampholytic synthetic detergents Ampholytic synthetic detergents can be broadly described as derivatives of alphatic or aliphatic derivatives of heterocyclic secondary and tertiary amines, in which the aliphatic radical may be straight chain or branched and wherein one of the aliphatic substituents contains from about 8 to 18 carbon atoms and at least one contains an anionic water-solubilizing group, e.g., carboxy, sulfo, sulfato, phosphato, or phosphono. Examples of compounds falling within this definition are sodium 3-(dodecylamino)-propionate

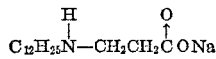

sodium 3-(dodecylamino)propane-1-sulfonate

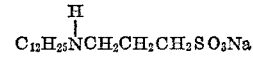

sodium 2-(dodecylamino)ethyl sulfate

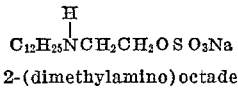

sodium 2-(dimethylamino)octadecanoate

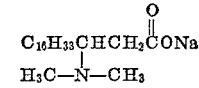

disodium 3-(N-carboxymethyl-dodecylamino)propane-1-sulfonate

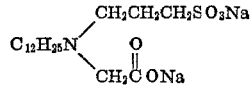

disodium 2-(oleylamino)ethyl phosphate

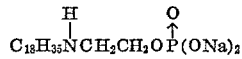

disodium 3-(N-methyl-hexadecylamino)propyl-1-phosphonate

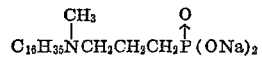

disodium octadecyl-iminodiacetate

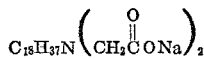

sodium 1-carboxymethyl-2-undecyl-imidazole

disodium 2-[N-(2-hydroxyethyl)octadecylamino]ethyl phosphate

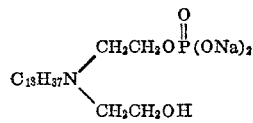

sodium N,N-bis-(2-hydroxyethyl)-2-sulfato-3-dodecoxy-propylamine

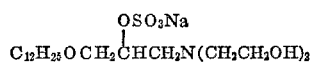

(D) Zwitterionic synthetic detergents

Zwitterionic synthetic detergents can be broadly described as derivatives of aliphatic quaternary ammonium and phosphonium or tertiary sulfonium compounds, in which the cationic atom may be part of a heterocyclic ring, and in which the aliphatic radical may be straight chain or branched, and wherein one of the aliphatic substituents contains from about 8 to 18 carbon atoms, and at least one aliphatic substituent contains an anionic water-solubilizing group, e.g., carboxy, sulfo, sulfato, phosphato, or phosphono. Examples of compounds falling within this definition are 3-(N,N-dimethyl-N-hexadecyl-ammonio)-2-hydroxy-propane-1-sulfonate

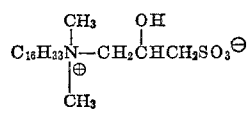

3-(N,N-dimethyl-N-hexadecylammonio)propane-1-sulfonate

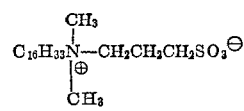

2-(N,N-dimethyl-N-dodecylammonio)acetate

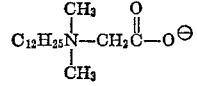

3-(N,N-dimethyl-N-dodecylammonio)propionate

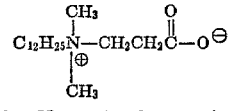

2-(N,N-dimethyl-N-octadecylammonio)-ethyl sulfate

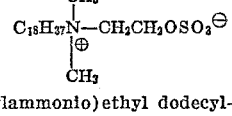

2-(trimethylammonio)ethyl dodecyl-phosphonate

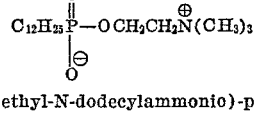

ethyl 3-(N,N-dimethyl-N-dodecylammonio)-propylphosphonate

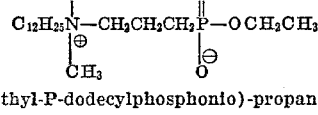

3-(P,P-dimethyl-P-dodecylphosphonio)-propane-1-sulfonate

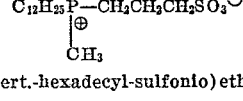

2-(S-methyl-S-tert.-hexadecyl-sulfonio)ethane-1-sulfonate

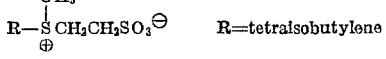

3-(S-methyl-S-dodecylsulfonio)propionate

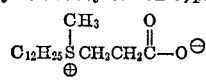

sodium 2-(N,N-dimethyl-N-dodecylammonio)ethyl phosphonate

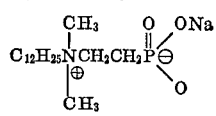

4-(S-methyl-S-tetradecylsulfonio)butyrate

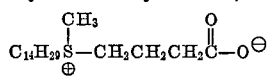

1-(2-hydroxyethyl)-2-undecyl-imidazolium-1-acetate

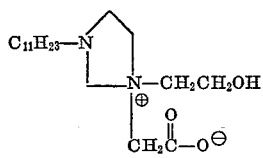

2(trimethylammonio)-octadecanoate

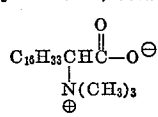

3-(N,N-bis-(2-hydroxyethyl)-N-octadecylammonio)-2-hydroxypropane-1-sulfonate

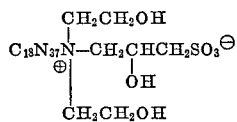

Some of these detergents are described in the following U.S. Patents: 2,129,264; 2,178,353; 2,774,786; 2,813,898; and 2,828,332.

A detergent composition prepared according to the present invention contains as essential ingredients (a) a detergent ingredient and (b) a builder ingredient. In its simplest terms, a composition can contain a single detergent compound and a single builder compound. On the other hand, it frequently is desirable to formulate a detergent composition in which the active detergent portion consists of mixtures of detergent compounds selected from the foregoing classes. Thus, for example, the active ingredient can consist of a mixture of two or more anionic detergents; or a mixture of an anionic detergent and a nonionic detergent; or, by way of another example, the active detergent can be a ternary mixture of two anionic detergents and a zwitterionic detergent.

The part of the complete formulation that functions as a builder can likewise be composed of a mixture of builder compounds. For example, the butane-1,2,3,4-tetraphosphonate compounds described herein can be mixed together with other water-soluble inorganic alkaline builder salts such as sodium tripolyphosphate or potassium pyrophosphates. Another example is a binary builder mixture consisting of butane - 1,2,3,4 - tetraphosphonate compound and a water-soluble organic builder salt such as water-soluble salts of nitrilotriacetic acid, ethylenediaminetetraacetic acid, ethane - 1 - hydroxy-1,1-diphosphonic acid, ethane-1-hydroxy-1,1,2-triphosphonic acid. Still further, the builder component of a complete formulation can consist of ternary mixtures of these several types of builder compounds.

Water-soluble inorganic alkaline builder salts which can be used in this invention in combination with the novel butane - 1,2,3,4 - tetraphosphonate compounds described herein are alkali metal carbonates, borates, phosphates, polyphosphates, bicarbonates and silicates. Ammonium, substituted ammonium, and amine salts of these materials can also be used. Specific examples of suitable salts are sodium tripolyphosphate, sodium carbonate, sodium tetraborate, sodium and potassium pyrophosphate, sodium and ammonium bicarbonate, potassium tripolyphosphate, sodium hexametaphosphate, sodium sesquicarbonate, sodium orthophosphate and potassium bicarbonate.

Examples of suitable organic water-soluble organic alkaline sequestrant builder salts which can be used mixed with the butane-1,2,3,4-tetraphosphonate compounds of this invention are alkali metal (sodium, potassium, lithium), ammonium or substituted ammonium, aminopolycarboxylates, e.g., the above mentioned sodium and potassium ethylenediaminetetraacetate, sodium and potassium N-(2 - hydroxyethyl) - ethylenediaminetriacetates, sodium and potassium nitrilotriacetates and sodium, potassium and triethanolammonium N-(2-hydroxyethyl)-nitrilodiacetates, sodium amino tri(methylenephosphonate). The alkali metal salts of phytic acid, e.g., sodium phytate, are also suitable as organic alkaline sequestrant builder salts. Certain other organic builders which can be used in admixture with the butane-1,2,3,4-tetraphosphonates described herein are water-soluble salts of ethane-1 - hydroxy - 1,1 - diphosphonic acid, ethane-1-hydroxy-1,1,2-triphosphonic acid, methylene diphosphonic acid, and the like.

The specific action of the builder mixtures of this invention will vary to some extent depending upon the ratio of active detergent to builder mixture in any given detergent composition. There will be considerable variation in the strengths of the washing solutions employed by different houswives, i.e., some housewives may tend to use less or more of the detergent compositions than will others. Moreover, there will be variations in temperature and in soil loads as between washing operations. Further, the degree of hardness of the water used to make up the washing solutions will also bring about apparent differences in the cleaning power and whiteness maintenance results. Finally, different fabrics will respond in somewhat different ways to different detergent compositions. The best type of detergent composition for household use would in theory be a composition which accomplishes an excellent cleaning and whiteness maintenance effect under the most diverse cleaning conditions. The built detergent compositions of this invention are especially valuable in this respect.

The builder mixtures taught herein are very efficient, and, in general, can be used to permit the attainment of equal detergency with a smaller total quantity of builder in relation to the total quantity of active detergent ingredient.

The built detergent compositions of the present invention can be formulated and prepared into any of the several commercially desirable solid and liquid forms including, for example, bars, granules, flakes, tablets, and water-based and alcohol-based liquid detergents, and the like. According to one embodiment of the present invention, solid detergent compositions are prepared containing an active detergent (sole active or a mixture of detergents) and a builder (single compound or a mixture) in the by weight ratio (detergent to builder) of about 2:1 to about 1:10; and preferably from about 1:1 to about 1:6. A special embodiment of this invention is a built liquid detergent composition containing an active detergent and a builder in the by weight ratio (detergent to builder) of 3:1 to about 1:10; preferably 2:1 to about 1:3. The potassium salts of the butane-1,2,3,4-tetraphosphonates are especially useful in liquid formulations due to the increased solubility characteristics of potassium over sodium.

Liquid detergent compositions generally present special problems to the formulator in view of the peculiarities inherent in aqueous systems and the special requirements of solubility of the ingredients, and more especially, their physical and chemical stability in such mediums. It is well known, for instance, that sodium tripolyphosphate, which is outstanding in its behavior in granular compositions, is generally regarded as being unsuited as a sole builder for built liquid detergents. It has a marked propensity to hydrolyze the lower forms of phosphate compounds which are less desirable builders. As a practical matter, therefore, it has been necessary to use a more stable form of a phosphate builder, i.e. pyrophosphate, notwithstanding the fact that the pyrophosphate is a relatively inferior detergency builder to tripolyphosphate. The butane-1,2,3,4-tetraphosphonate compounds solve this particular problem because they are, at the same time, much better builders than tripolyphosphates while being hydrolytically stable. In view of the increasing acceptance by the general public of built liquid detergent compositions for virtually all washing and cleaning situations including laundering and dishwashing, it is a very significant contribution of this invention that an improved built liquid detergent product is made possible that will far outperform known liquid detergents while at the same time being free of the troublesome problem of stability.

Built liquid detergents are usually water based or have a mixture of water and alcohol in the liquid vehicle. Such liquid vehicles can be satisfactorily employed in formulating a composition according to the present invention. Accordingly, a sample built liquid detergent composition of this invention can consist essentially of a detergent ingredient (a single detergent or a mixture of detergents) and a butane-1,2,3,4-tetraphosphonate containing builder ingredient (either as a single builder or in admixture with other builders), with the balance of the composition to 100% being a liquid vehicle such as water or a water alcohol mixture, and the like.

The built detergent compositions of the present invention perform at their maximum level in a washing solution which has a pH in the range of from about 8 to about 12. Within this broad range, it is preferred to operate at a pH of from about 9 to 11. The detergent and the builder can be neutralized to a degree sufficient to insure that this pH prevails in any washing solution. If desired, other alkaline materials can be added to the complete formulation to provide for any pH adjustments desired. A preferred embodiment is to have the detergent composition whether in solid or liquid form provide a pH in the aforementioned ranges at the usual recommended usage levels.

In a finished detergent formulation, there can be present other materials which make the product more effective or more aesthetically attractive. The following are mentioned only by way of example. A water-soluble sodium carboxymethyl cellulose can be added in minor amounts to inhibit soil redeposition. Tarnish inhibitors such as benzotriazole or ethylenethiourea can also be added in amounts up to about 3%. Fluorescers, and brighteners, enzymes, perfumes, coloring agents, while not per se essential in the compositions of this invention, can be added in minor amounts. As already mentioned, an alkaline material or alkali such as sodium or potassium hydroxide can be added as supplementary pH adjusters. Other usual additives include sodium sulfate, sodium carbonate, water, and the like. Corrosion inhibitors are also frequently used. Water-soluble silicates are highly effective corrosion inhibitors and can be added if desired at levels of from about 3% to about 8% by weight of the total composition. Alkali metal, preferably potassium and sodium silicates, are preferred having a weight ratio of $SiO_2:M_2O$ of from about 1.0:1 to 2.8:1. (M refers to sodium or potassium.) Sodium silicate having a ratio of $SiO_2:Na_2O$ of from about 1.6:1 to 2.45:1 is especially preferred.

In the embodiment of this invention which provides for a built liquid detergent, a hydrotropic agent may be found desirable. Suitable hydrotropes are water-soluble alkali metal salts of toluenesulfonate, benzenesulfonate, and xylene sulfonate. Preferred hydrotropes are potassium or sodium toluenesulfonates. The hydrotrope salt may be added, if desired, at levels up to about 12%. While a hydrotrope will not ordinarily be found necessary, it can be added, if so desired, for any reason such as to function as a solubilizing agent and to produce a product which retains its homegeneity at a low temperature.

The following compositions, in which the percentages are by weight, will serve to illustrate, but not limit, the invention. Each of the compositions in the following examples give in solution a pH within the desired range of from about 8 to about 12.

EXAMPLE A

An excellent granular built detergent composition according to this invention has the following formulation:

| | Percent |
|---|---|
| Sodium alkyl benzene sulfonate in which the alkyl is a straight chain radical comprised of alkyl groups averaging 13 carbon atoms | 18 |
| Hexasodium dihydrogen butane-1,2,3,4-tetraphosphonate | 50 |
| Sodium sulfate | 15 |
| Sodium silicate (ratio of $SiO_2:Na_2O$ of 2:1) | 7 |
| Water | 10 |

This heavily built detergent composition is especially valuable for laundering heavily soiled clothes.

The straight chain sodium dodecyl benzene sulfonate in the preceding composition can be replaced on an equal weight basis by either branched chain sodium dodecyl benzene sulfonate, the dodecyl derived from tetrapropylene, sodium tallow alkyl sulfate, sodium coconut oil alkyl sulfate, sodium olefin sulfonate as described in the specification derived from alpha olefins having an average of 14 carbon atoms in the molecule, or a mixture of straight chain dodecyl benzene sodium sulfonate and sodium tallow alkyl sulfate on an equal weight basis. The sodium tetraphosphonate builder can be replaced by a potassium salt of butane-1,2,3,4-tetraphosphonic acid; a 1:1 mixture of sodium tripolyphosphate and heptasodium hydrogen butane-1,2,3,4-tetraphosphonate; a 1:1:1 ternary mixture of sodium tripolyphosphate, sodium nitrilotriacetate and tetrasodium tetra hydrogen butane-1,2,3,4-tetraphosphonate; a 1:1 mixture of sodium nitrilotriacetate and sodium butane-1,2,3,4-tetraphosphonate; a 1:1 mixture of sodium butane-1,2,3,4-tetraphosphonate and sodium aminotri(methylene phosphonate).

EXAMPLE B

Another granular detergent composition having outstanding cleaning properties has the following formulation:

| | Percent |
|---|---|
| Straight chain sodium dodecyl benzene sulfonate (anionic detergent) | 4 |
| Sodium tallow alkyl sulfate (anionic detergent) | 4 |
| Dodecyl methyl sulfoxide | 2 |
| Hydrogenated marine oil fatty acid | 2 |
| Sodium butane-1,2,3,4-tetraphosphonate | 60 |
| Sodium silicate (ratio of $SiO_2:Na_2O$ of 1.6:1) | 10 |
| Sodium sulfate | 14 |
| Hydrolase enzyme | .01 |
| Water | 6 |

In this example, the total active detergent of 10% can be totally the nonionic species. In addition, the 2% dodecyl methyl sulfoxide can be replaced either by an alkylphenol ethylene oxide condensate formed by a condensation reaction between dodecyl phenol and 5 moles of ethylene oxide per mole of dodecyl phenol, or by 3-dodecyldimethylammonio)-2-hydroxy propane-1-sulfonate.

The sodium salt of the tetraphosphonate builder can be added as the salt or it can be present as the free acid neutralized in situ to any salt form ranging from the monosodium or monopotassium salt to the fully neutralized octasodium or octapotassium salt.

EXAMPLE C

This is also an example of a granular detergent composition of outstanding efficiency.

| | Percent |
|---|---|
| Straight chain dodecylbenzene sodium sulfonate [1] (anionic detergent) | 20 |
| Trisodium salt of butane-1,2,3,4-tetraphosphonic acid | 49 |
| Sodium silicate (ratio $SiO_2:Na_2O$ of 2:1) | 6 |
| Sodium sulfate | 14 |
| Water | 11 |

[1] This detergent compound is also referred to as linear dodecyl benzene sodium sulfonate.

In this example, the anionic detergent can be replaced on an equal weight percentage with a sodium olefin sulfonate as described above in which the olefin sulfonate consists of a mixture of chain lengths ranging from 10 to about 18 carbon atoms.

EXAMPLE D

The following formulation is for a granular detergent composition that is an outstanding detergent composition:

| | Percent |
|---|---|
| Dodecyldimethylamine oxide (nonionic detergent) | 16.0 |
| Disodium butane-1,2,3,4-tetraphosphonate | 40.0 |
| Toluene sulfonate | 1.8 |
| Sodium silicate (ratio of $SiO_2:Na_2O$ of 2:1) | 8.0 |
| Sodium sulfate | 2.0 |
| Diethanolamido of coconut fatty acid | 1.9 |
| Protease enzyme | .02 |
| Benzotriazole | .02 |
| Balance to 100% water. | |

In this composition, the nonionic detergent can be replaced by tetradecyl dimethyl phosphine oxide, sodium-3-dodecylaminopropionate, sodium - 3 - dodecylaminopropanesulfonate, 3(N,N-dimethyl-N - hexadecylammonio)-propane-1-sulfonate or 3-(N,N-dimethyl-N-dodecylammonio)-2-hydroxypropane-1-sulfonate. Twenty percent of the builder can be replaced with an equal weight replacement of trisodium nitrilotriacetate.

EXAMPLE E

A liquid detergent which is especially effective in cool water as a heavy duty detergent and has the following composition:

| | Percent |
|---|---|
| 3(N,N-dimethyl-N - hexadecylammonio) - 2 - hydroxypropane-1-sulfonate | 12.0 |
| Octapotassium butane-1,2,3,4-tetraphosphonate | 20.0 |
| Sodium silicate (ratio of $SiO_2:Na_2O$ of 1.6:1) | 3.8 |
| Potassium toluenesulfonate | 8.5 |
| Sodium carboxymethyl hydroxymethyl cellulose | .3 |
| Fluorescent dye | .12 |
| Perfume | .15 |
| Benzotriazole | .02 |
| Water | 55.11 |

EXAMPLE F

Another light duty built liquid detergent consists of:

| | Percent |
|---|---|
| Sodium salt of sulfuric acid ester of the reaction product of one mole of coconut oil alcohol and 3 moles of ethylene oxide | 11.0 |
| Dodecyldimethylamino oxide | 6.0 |
| Sodium tallow alkyl sulfate | 2.25 |
| Hexapotassium butane-1,2,3,4-tetraphosphonate | 12.0 |
| Potassium toluene sulfonate | 5.5 |
| Water | 63.25 |

This composition is especially suited for dishwashing and fine fabric washing situations.

BRIEF DESCRIPTION OF THE DRAWINGS (a) Phosphorus magnetic resonance ($P^{31}MR$) analysis was performed on compounds prepared by the present invention. It was discovered that the phosphorus atoms of butane-1,2,3,4-tetraphosphonate can be grouped into two kinds, ends and middles. These two kinds of phosphorus have the same chemical shift and therefore fall under the same peak when the $P^{31}MR$ spectrum of either the ester or the acid is obtained. As the acid compounds are neutralized, however, it is interesting that the two kinds of phosphorus begin to exhibit different shifts and two regions of absorption are seen. FIG. 1 reproduces the $P^{31}MR$ spectra obtained for octamethylester of butane-1,2,3,4-tetraphosphonic acid, butane-1,2,3,4-tetraphosphonic acid, as well as for an $Na_5H_3$ sodium salt.

Figure 2:
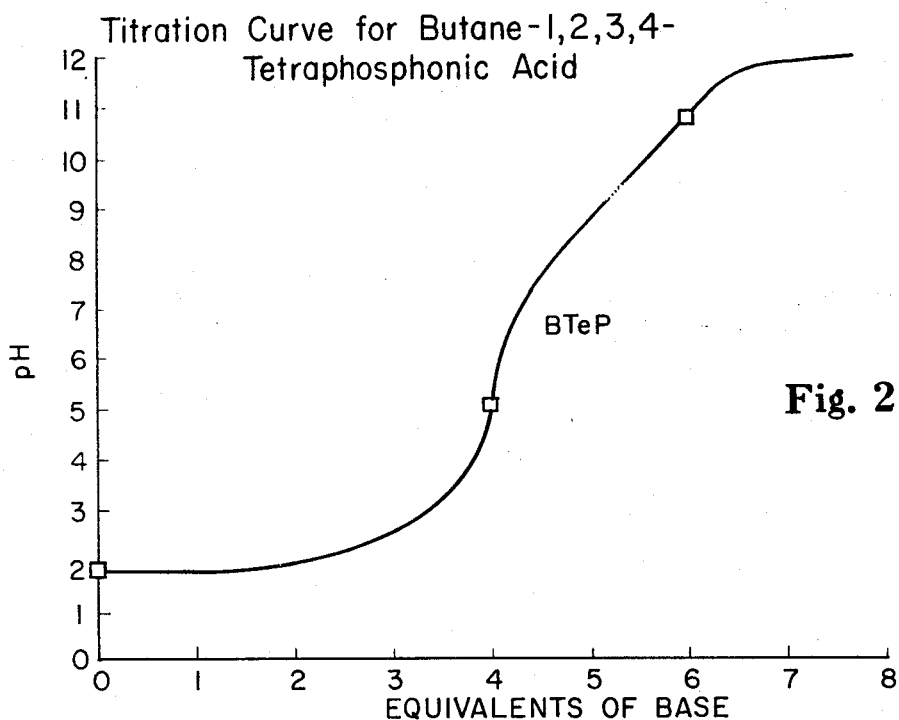

(b) The titration curve for butane-1,2,3,4-tetraphosphonic acid is reproduced in FIG. 2. Two breaks can be seen in the titration of this acid corresponding to the titration of 4 of the 8 acidic hydrogens at a pH about 5 with the others coming off at a pH of about 11 or higher. Above pH 11 it is difficult to determine titrations with clarity due to the relative base strength of the sodium hydroxide. This curve, however, does show the relative acid strengths of the protons of the butane-1,2,3,4-tetraphosphonic acid.

Figure 3:
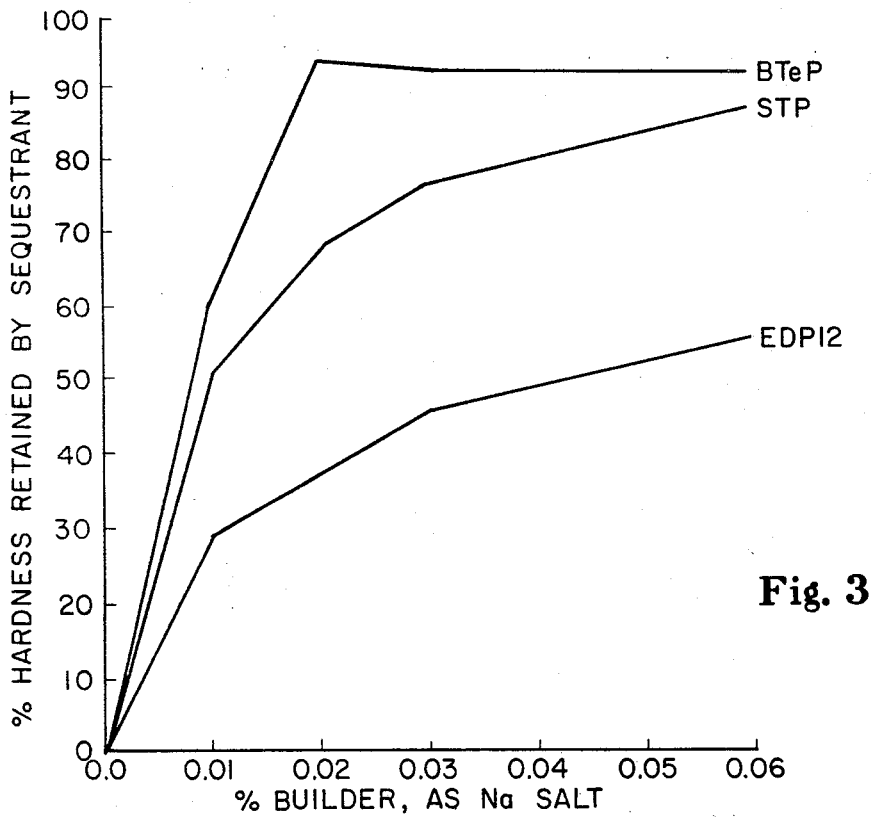

(c) The unexpectedly notable sequestering properties of butane-1,2,3,4-tetraphosphonate compounds is shown in FIG. 3. The test used to discover these properties is called a Swatch-Dip test which measures the relative sequestering ability of a compound by employing a fabric-swatch impregnated with soap an an aqueous solution containing a predetermined level of calcium hardness minerals. Briefly, the procedure calls for preparing the aqueous solution containing the hardness ions, e.g., pH 10, and dipping into it or immersing into it a fabric-swatch which has been impregnated with a measured amount of soap. The swatch remains in the solution for a predetermined amount of time. A measurement is then made to determine the amount of free calcium which has been adsorbed by the fabric-swatch. The identical procedure is then repeated but with a predetermined concentration of a sequestrant compound added to the aqueous solution containing the calcium ions. Measurements of adsorbed calcium are again made and comparisons drawn. Differences between the amounts of calcium adsorbed in tests with and without sequestrants, is attributed to the ability of the sequestrant to tie-up or sequester the calcium and thereby decrease the level of free calcium ion concentration available for adsorption by the immersed fabric swatch. A percentage is obtained in this manner called "percent hardness retained by sequestrant." Several tests were conducted in this manner using sodium tripolyphosphate (STP), sodium ethane-1,2-diphosphonate (EDP12), and sodium salt of butane-1,2,3,4-tetraphosphonic acid. The results are given in FIG. 3. It can be seen that ethane-1,2-diphosphonate, which can also be thought of as a vicinal polyphosphonate, reached a maximum percentage of about 56% retained hardness at a concentration of 0.06% in the aqueous solution. At a concentration of 0.03% the level fell to about 46%; at .01%, the figure fell to 29%. Sodium tripolyphosphate by comparison sequestered 88% at 0.06% concentration, 77% at 0.03% concentration, 68% at .02% and 51% at .01%. Below .03% concentration, both STP and ED12 fall off markedly in their efficiency. However, it can be seen from FIG. 3 that not only did butane-1,2,3,4-tetraphosphonate surpass STP at .06% in performance (92% vs. 88%) but exceeded it even more significantly at lower concentrations until at .02% concentration the tetraphosphonate reached 95% hardness retained; by comparison, at .02% concentration the STP only sequestered 68%. At .01% concentration, the sodium butane - 1,2,3,4 - tetraphosphonate sequestered 62% which exceeds the figure for sodium ethane-1,2-diphosphonate at .06%. This demonstration not only serves to show the superior efficiency of the compounds of the present invention over a well-known sequestrant such as STP but also to demonstrate the surprising improvement between somewhat structurally relate compounds, i.e., ethane-1,2-diphosphonate, It is readily apparent that in any given application involving a sequesterant it is possible to attain a desired level of sequestering capacity by using substantially less butane-1,2,3,4-tetraphosphonate.

A unique property of the alkali metal salts of butane-1,2,3,4-tetraphosphonic acid which makes them specially useful in formulating liquid detergent compositions is the outstanding solubility of these compounds in water. It has been discovered that the alkali metal salts of butane-1,2,3,4-tetraphosphonic acid, e.g., sodium and potassium butane-1,2,3,4-tetraphosphonates exhibit solubilities of greater than 58% in water. Unlike other phosphonates with low solubility or with relatively high solubility in a rather narrow pH range, all alkali metal salts of butane-1,2,3,4-tetraphosphonate are very soluble. This desirable characteristic enhances greatly the versatility of these compounds for various detergent formulations, especially built liquid detergent compositions.

This unique water solubility characteristic was demonstrated by the following procedure. Sodium salts of butane-1,2,3,4-tetraphosphonic acid were prepared as solids, and each then combined with a limited amount of water in attempting to establish solution-solid equilibrium. However, no true solid phase can be established. On addition of water, all the solids went to viscous gums in which no crystals could be detected microscopically after standing for 2 days at 80° F. This viscous material simply became less viscous as more water was added.

In order to establish minimum solubility values for the salts, samples of the clear viscous masses were weighed, and then reduced to anhydrous by drying in an Abderhalten drying apparatus with $P_2O_5$ over boiling xylene. The weights of the dry salts then allowed calculation of the percent solid in solution. The values obtained for sodium salts of butane-1,2,3,4-tetraphosphonate are given below:

TABLE I

|  | Na salt | | | | |
|---|---|---|---|---|---|
|  | 4 | 5 | 6 | 7 | 8 |
| Butane-1,2,3,4-tetraphosphonate | 66 | 67 | 59 | 59 | 58 |

Detergent compositions containing the compounds of the present invention as builders provide marked and unexpected efficiency advantages over technical classes of builders represented, for instance, by sodium tripolyphosphonate (STP) as well as builders discovered and developed within the last few years. This latter class is represented in the following demonstration by ethane-1-hydroxy-1,1-diphosphonates (EHDP) which are described in U.S. Pat. 3,159,581.

An efficiency advantage was discovered and is demonstrated by the following evaluation. A series of detergency tests was conducted which is referred to as a facial swatch test. This test involves a procedure of soiling a cloth swatch with natural soil by attaching a swatch (about 5 inches by 5 inches) to the plunger cup of an electric vibrator massager. Two swatches are soiled from an individual subject by massaging the right and left halves of the face respectively for one minute each. The resulting soiled swatches are randomized into different groups to statistically provide equal numbers of left and right samples. The swatches are then washed, rinsed and graded and the cycle is repeated nine times. The washing step consists of laundering the soiled swatches in an aqueous solution having a temperature of 140° F., a pH of 10, and containing 7 grains hardness.

A mechanical washer is used which is equipped with an agitator and otherwise simulates an ordinary home washing machine. The detergent compositions tested consisted of an active synthetic detergent at a concentration of .03% in the wash water and a builder ingredient at a concentration of .03% and .06%. As noted above, the builders tested were pentasodium tripolyphosphate, trisodium ethane-1-hydroxy-1,1-diphosphonate, and hexasodium butane-1,2,3,4-tetraphosphonate. Following the washing of the soiled swatches, they were rinsed and dried and then whiteness measurements were made with a commerically available photoelectric reflectometer, i.e., a Hunter Color and Color Difference meter manufactured by Henry A. Gardner Laboratory, Inc. This instrument is designed to distinguish color differences and operates on the tristimulus colorimeter principle. According to this principle, a 45 degree diffuse reflectance of an incident light beam on a test specimen is measured through a combination of green, blue and amber filters. The electrical circuitry of the instrument is so designed that lightness and chromaticity values for the test specimen are read directly. The departure from white ($TiO_2$ being taken as a standard white) of the test specimen is calculated by introducing the lightness and chromaticity values so obtained into a complex formula supplied by the manufacturer. An evaluation of relative whiteness performance compared to a standard detergent composition is thus obtained for the test formulations. A more comprehensive description of this device and its mode of operation appears in Color In Business, Science and Industry by Deane B. Judd, pages 260–262; published by John Wiley & Sons, New York (1952).

The measurements obtained by the foregoing procedure are given below in the table. The efficiency advantage becomes readily apparent from a consideration of those figures. Each of the three builder compounds was tested at a concentration of .03% and .06% in washing the soiled swatches.

The synthetic detergent which was used in each of the following evaluations at a concentration in the wash solutions of .03% was sodium dodecylbenzene sulfonate, the dodecyl group being derived from tetrapropylene.

TABLE II

| Builder | Column I, .30% | Column II, .06% |
|---|---|---|
| 1. Hexasodium butane-1, 2, 3, 4-tetraphosphonate (BTeP) | 90.65 | 89.82 |
| 2. Trisodium ethane-1-hydroxy-1, 1-diphosphonate (EHDP) | 89.92 | 89.90 |
| 3. Pentasodium tripolyphosphate (STP) | 88.30 | 90.74 |

In the foregoing table a statistically significant difference is .68.

It can be seen from Column II that at a concentration of .06% the three values are essentially the same with a slight advantage being shown for STP. However, at a concentration of only .03% (Column I) it is evident that hexasodium butane-1,2,3,4-tetraphosphonate affords a level of cleaning performance substantially superior to pentasodium tripolyphosphate (STP). The magnitude of the improvement of the butane-1,2,3,4-tetraphosphonate at .03% can be fully appreciated by noting that at this relatively low concentration of builder (Column I), butane-1,2,3,4-tetraphosphonate achieved a cleaning value which is substantially equal to that obtained with STP at .06% (Column II). From this demonstration, it is apparent that in some situations it is possible to achieve a level of builder performance with only half the concentration of butane-1,2,3,4-tetraphosphonate than would be required with STP.

By virtue of the capacity of the compounds of this invention to inhibit the crystal growth and development of calcium hydroxylapatite, they are useful as anti-calculus agents in oral compositions as more fully described and claimed in a concurrently filed co-pending, commonly assigned patent application of Homer W. McCune and Nathaniel B. Tucker. This concurrently filed patent application Ser. No. 693,713 (abandoned in favor of Ser. No. 731,312 which is now U.S. Pat. 3,488,419, is incorporated herein by reference.

What is claimed is:

1. Lower alkyl esters of butane-1,2,3,4-tetraphosphonic acid.

2. A process for preparing lower alkyl esters of butane-1,2,3,4-tetraphosphonic acid which comprises reacting
   (A) a butyne compound having a formula
   $XCH_2-C{\equiv}C-CH_2X$
   in which X is selected from the group consisting of bromine, chlorine, iodine, hydroxyl, and ortho-tosyl,
   (B) a hydrogen dialkylphosphite ester in which the alkyl group is a lower alkyl group containing from 1 to about 6 carbon atoms, and
   (C) a reaction promoter which is an alkali metal selected from the group consisting of sodium, potassium, and lithium, or a hydride thereof.
   at a temperature in the range of from about 20° C. to about 100° C.,
   for from about five minutes to about 60 hours,
   said hydrogen dialkylphosphite ester being present in the reaction in excess of a molar proportion of 6:1, of said dialkyl phosphite to said butyne compound, said alkali metal promoter being present in the reaction at a molar proportion of from about 2.05:1 to 2.5:1, of promoter to butyne compound.

3. A process described in claim 2 wherein said butyne compound is one in which X is hydroxyl.

4. A process described in claim 2 wherein said hydrogen dialkyl phosphite ester is selected from hydrogen dimethyl phosphite, hydrogen diethyl phosphite, and hydrogen diisopropyl phosphite.

5. A process described in claim 2 wherein the reaction temperature is in the range of from about 50° to about 80° C.

6. A process described in claim 2 wherein said butyne compound and said hydrogen dialkyl phosphite ester are present in a molar proportion in a range of from about 1:6 to about 1:12, of butyne compound to phosphite compound.

References Cited

UNITED STATES PATENTS

| | | | |
|---|---|---|---|
| 3,400,176 | 9/1968 | Quimby | 260—932 |
| 2,634,288 | 4/1953 | Boyes et al. | 260—932 |
| 3,093,672 | 6/1963 | Miller | 260—970 X |

OTHER REFERENCES

Pudovik et al., Chem. Abs., vol. 64 (1966), p. 14208.

LEWIS GOTTS, Primary Examiner

A. H. SUTTO, Assistant Examiner

U.S. Cl. X.R.
252—89, DIG 17; 260—502.4 P, 970